June 18, 1935. W. W. ARROWSMITH 2,005,449

BAKING PAN

Filed Jan. 17, 1935

Inventor:
William Walter Arrowsmith
Walter Gunn
By his Attorney:

Patented June 18, 1935

2,005,449

UNITED STATES PATENT OFFICE 2,005,449

BAKING PAN

William Walter Arrowsmith, All Saints,
Chorlton-on-Medlock, England

Application January 17, 1935, Serial No. 2,261
In Great Britain June 2, 1934

7 Claims. (Cl. 53—6)

This invention refers to bread and like baking tins, and chiefly those used for making bread in the form of what are termed "one pound", "two pound" or "four pound" loaves.

In the placing of the tins in a large oven as used in bakeries, it is desirable that they shall, on the one hand, lie in as small a compass as possible to ensure the maximum number of loaves being baked at one time, and, on the other hand, shall lie at a slight distance apart along their top edges, so as to ensure even and regular baking of the whole of the contents of each tin by circulation of hot air around and between them.

Considerable time and care are usually given to the proper spacing of tins and it has been proposed to connect a series of tins together by bars riveted to the ends of the tins. Such expedient however, does not take account of even spacing between one series of tins and another series, and the spacing of the several series is still left to the judgment of the baker. This "series spacing" is not so simple as it may appear, as with the oven of substantial size and viewed only from the oven door, which tends to foreshorten the vision, it is difficult to space the various series to the best advantage. Usually, the tins are first placed on a plate adapted to slide into the oven, but with rough handling or impact against another plate, the spacing is upset. Again, during the time taken in spacing the tins the plate is cooling, "proving" of the bread continues, and the bread is over-proved.

The object of this invention is to overcome the aforesaid drawbacks.

According to the invention, the baking tins, either separately, or in series, are provided with spacing members adapted to engage or contact with adjacent tins, or adjacent series of tins, on the latter being pushed together in the oven, or on the carrier plate, and thereby, without any waste of time, correctly position the tins, the spacing members ensuring of the desired opening between the tins for correct baking. Further, the said spacing members are arranged in such positions relatively to the sides and ends of the tins, or series of tins, that no matter in which way the tins or series of tins are assembled in compact order, the spacing members never foul one another.

In one example of the invention, each individual tin is provided with a strip of metal on each of its four sides, and in the length of each such strip is a part, which projects outwards and constitutes a spacing member. On any two or more of such tins being placed side by side, the spacing members of each tin contact with the adjacent tins, and thereby cause the tins along their top edges to lie apart.

In another example of the invention, a series of tins is connected at their ends (or sides) by bars common to all, and in such bars are portions which extend outwards away from the tins for a short distance, such outwardly extending portions constituting spacing members. Additional bars, with one or more outwardly projecting parts, are also applied to the end tins of the series.

The invention will now be further described with the aid of the accompanying drawing, wherein:—

Figure 1:
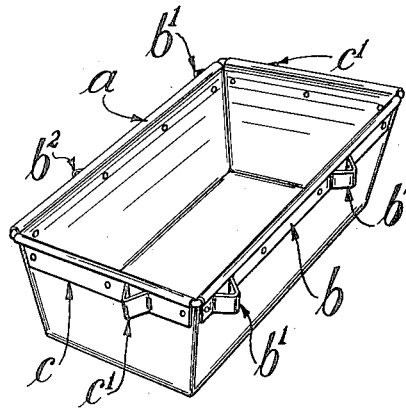
Fig. 1 illustrates in perspective a "single" baking tin with one example of the invention applied thereto.

Referring to Fig. 1, $a$ is the single baking tin, to the opposite longer sides of which are applied narrow metal bars $b$, $b$, usually about half an inch wide and one-eighth of an inch thick. Such bars are riveted to the tin. At points in their length, said bars are formed, by bending, with V-shaped projections $b^1$, $b^2$, which lie at different distances from the ends of the bars, the projection $b^1$ lying at say 1½" from the one end of the bar, and the projection $b^2$ lying at say 3" from the opposite end of the bar. The bar on one side will be the reverse of the other bar in respect to the distances of the projections from its ends.

Further bars $c$, $c$ are applied to the ends of the tin, but each having only a single projection $c^1$, arranged nearer one end of the bar than the other, and that of one bar near the left hand end, whilst that of the other bar is near the right hand end.

Figure 2:
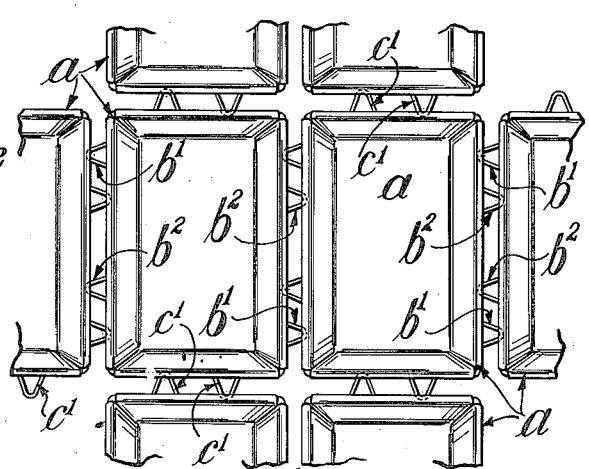
Fig. 2 illustrates a plan view of a pair of "single" tins surrounded by several similar tins.

Fig. 2 shows a group of "single" tins, from which view it will be seen how the projections $b^1$, $b^2$, $c^1$ permit of the tins being arranged in any relationship, end to end, or side by side, and either way round, without such projections fouling one another.

Figure 3:
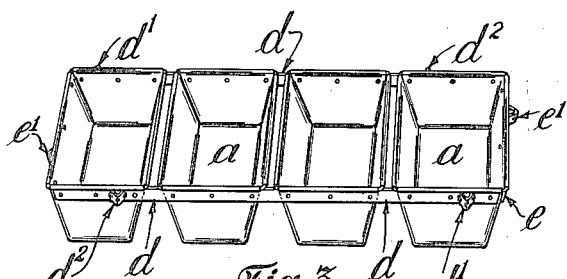
Fig. 3 illustrates in perspective a series of four tins, held together to form a "series unit" according to the invention.

In Fig. 3 a series of four tins is connected by bars $d$, $d$, secured to the ends of the tins, each bar being formed with V-shaped projections $d^1$, $d^2$. Along the outer side face of each end tin is a further bar $e$, with projection $e^1$. As in the case of the single tins, the projections are "off-set" in relation to the ends or sides of the tins, so that as shown in Fig. 4, no matter what way the series of tins are assembled, end to end, or side by side, and either way round, the projections of one series do not foul those of another series.

Figure 6:
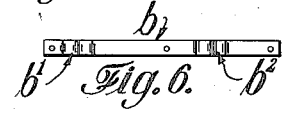
Figs. 6 and 7 illustrate face and edge views respectively of one example of spacing bar used with the single tins.
Figure 7:
Figure 8:
Figs. 8 and 9 illustrate face and edge views respectively of another example of spacing bar used with the single tins.
Figure 9:

The projections of the bars will usually be formed by folding a portion of the bar upon itself to the shape of the letter V, see Figs. 6 and 7. They may, however, be formed by turning out the ends of the bars at right angles to the bar and folding over the extreme ends of the bar upon itself, as shown in Figs. 8 and 9.

Figure 5:
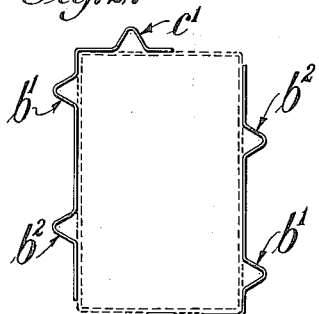
Fig. 5 is a plan of a modification.

In the case of a "single" tin, each side bar may extend along one side of the tin and also along a part of one end of a tin, each bar extending from one corner of one side of the tin and at its other end extending round the corner of the tin and terminating on the end face of the tin, see Fig. 5. The bars of the series of tins may be similarly formed. Or a single bar may extend all round the tin, or series of tins.

Figure 4:
Fig. 4 illustrates a plan view of a "series unit", surrounded by four other similar "series units".

In all cases, the projections on one side and one end of a tin, or series of tins are "off-set" in relation to the projections on the opposite side and end, as shown in Figs. 2, 4 and 5. The bars will usually be held to the tins by rivets, but they may be secured thereto by brazing, or by bolts and nuts.

In use, the bars, being of flat section, do not substantially obstruct the spaces provided by them between the tins, so that not only is the required "spacing out" assured, but the same is obtained without prejudice to the results obtainable therefrom, and the tins or units may be pushed in quickly and without waste of time or space.

Whilst chiefly applicable to tins of the particular size and shape before named, it will be understood that the invention may be applied to tins of other sizes and shapes which allow of the same principle of spacing by attached spacing members.

What I claim is:—

1. Bread and like baking tins provided with spacing members on their sides and ends, and those spacing members on one side or end offset in relation to those on the opposite side or end, as herein set forth.

2. Bread and like baking tins as claimed in claim 1, wherein single tins are each provided with bars on opposite sides and on opposite ends, having lateral projections extending therefrom, the projections on one side and one end being offset in relation to those on the opposite side and end of the tin, as herein set forth.

3. Bread and like baking tins as claimed in claim 1, wherein a series of tins is secured together and spaced apart by bars having lateral projections extending away from the tins, and further bars with lateral projections applied to the outer sides of the endmost tins of the series, the projections of the bars for connecting the series of tins being offset relatively to each other, as also those of the other bars, as herein set forth.

4. In bread and like baking tins, as claimed in claim 1 and in means for providing them with lateral spacing members near their upper edges, light metal bars having V-shaped projections formed in them by folding, as herein set forth.

5. In bread and like baking tins as claimed in claim 1, and in means for providing them with lateral spacing members near their upper edges, light metal bars having a single V-shaped projection formed in them by folding, as herein set forth.

6. In bread and like baking tins as claimed in claim 1, and in means for providing them with spacing members, light metal bars having their ends turned outwards to produce the said spacing members, as herein set forth.

7. In bread and like baking tins as claimed in claim 1, and in means for providing them with spacing members, a pair of light metal bars each extending along two right-angled side surfaces of the tins, and the spacing members of one bar being offset in relation to the spacing members of the other bar, as herein set forth.

WILLIAM WALTER ARROWSMITH.